C. G. EDEN.
DRIVING CHAIN OF THE SILENT TYPE.
APPLICATION FILED JUNE 20, 1914.
Patented Apr. 25, 1916.
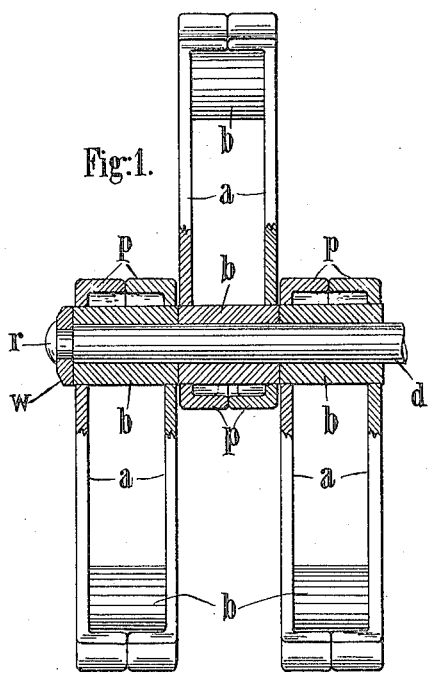
Fig. 1.
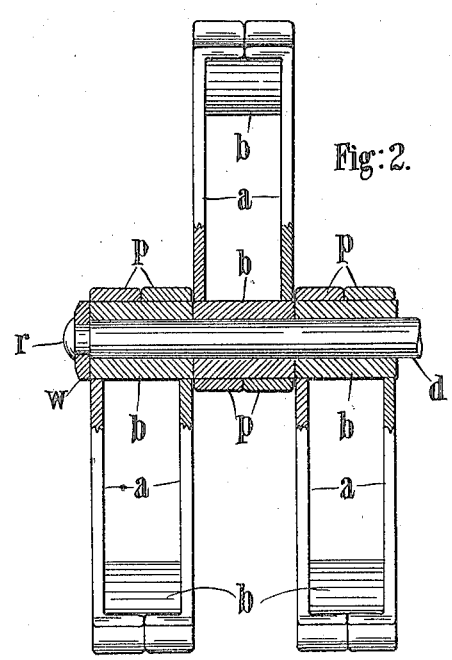
Fig. 2.
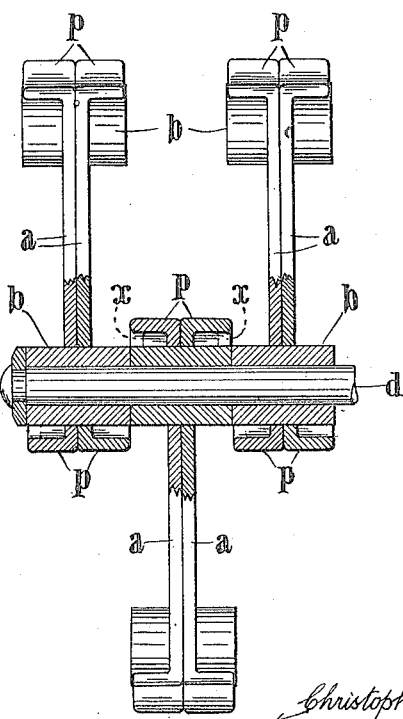
Fig. 3.
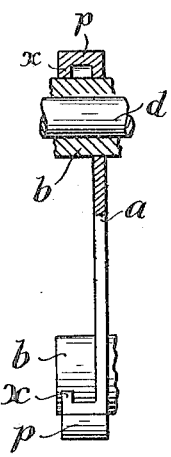
Fig. 3ᵃ.
Inventor
Christopher Gabriel Eden

C. G. EDEN.
DRIVING CHAIN OF THE SILENT TYPE.
APPLICATION FILED JUNE 20, 1914.

1,180,578.

Patented Apr. 25, 1916.
2 SHEETS—SHEET 2.

Witnesses

Inventor
Christopher Gabriel Eden.
per
Attorney.

UNITED STATES PATENT OFFICE.

CHRISTOPHER GABRIEL EDEN, OF MANCHESTER, ENGLAND, ASSIGNOR TO HANS RENOLD LIMITED, OF MANCHESTER, ENGLAND.

DRIVING-CHAIN OF THE SILENT TYPE.

1,180,578.   Specification of Letters Patent.   Patented Apr. 25, 1916.

Application filed June 20, 1914. Serial No. 846,283.

*To all whom it may concern:*

Be it known that I, CHRISTOPHER GABRIEL EDEN, a subject of the King of Great Britain, and resident of Progress Works, Brook street, Manchester, England, have invented certain new and useful Improvements in Driving-Chains of the Silent Type, of which the following is a specification.

This invention relates to driving chains of the type usually called "silent chains", made from stamped or pressed links or coined links—that is to say, links shaped from blanks by dies in an analogous manner to that in which coins are made—wherein the gearing faces of the teeth are formed by bending the ends of the links at right angles to the webs and the links are connected together by bushes and studs.

It is the object of the invention to provide relatively light chains which are cheap to manufacture, and sufficiently strong and durable for many of the uses for which silent chains are required.

Another object is to provide a light chain which will be stiff to resist lateral whipping.

Further objects are to provide a cheap and light chain which is easy to assemble, to join up and to take apart, and is suitable to gear on one face only or on both faces if required, and to provide a cheap construction in which heat treatment of the body of the link is obviated.

The invention is illustrated in the accompanying drawings, in which:—

Figure 4:
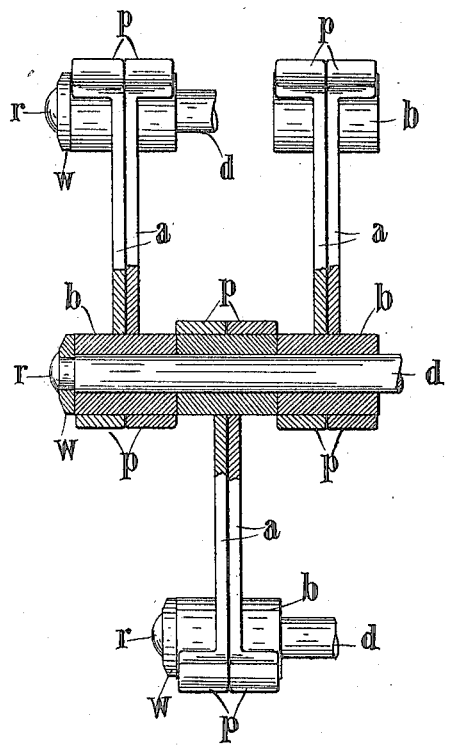
Figure 5:
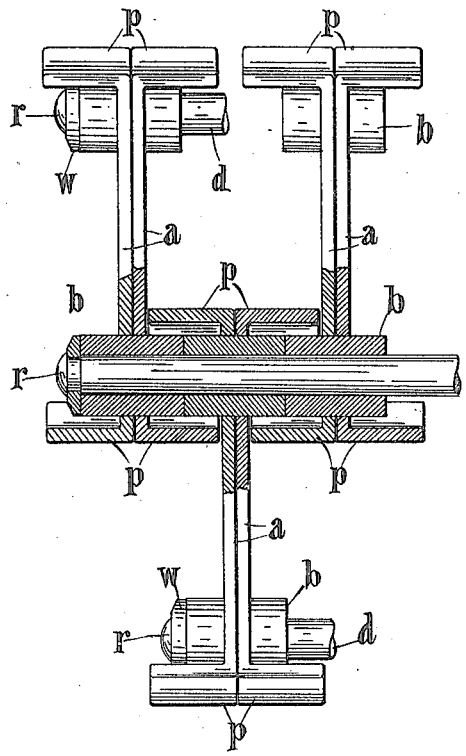

Figure 1 is a plan view, partly in section, of part of a chain made with "rectangular" elements. Fig. 2 is a plan view, partly in section, of part of a chain made with "rectangular" elements of modified construction. Fig. 3 is a plan view, partly in section, of part of a chain made with "I-shaped" elements. Fig. 3ª shows a modified form of link, partly in section. Fig. 4 is a plan view, partly in section, of part of a chain made with "I-shaped" elements of modified construction. Fig. 5 is a plan view, partly in section, of part of a chain made with another modification of "I-shaped" links.

In the drawings each element consists of a pair of half-I links $a$ $a$, which are made by stamping, pressing or coining for the sake of lightness and so forth. These links are held together by two bushes $b$ $b$ forced into holes punched in the links, there being one bush at each end of the element, while the end-projections $p$ $p$ of the links may either point toward one another to form a "rectangular" element, as shown in Figs. 1 and 2, or away from one another to form an "I-shaped" element, as shown in Figs. 3, 4 and 5. The studs $d$ pass through the bushes $b$, and hold the chain together by means of washers $w$, riveted in the usual way, as shown at $r$. These washers may be used also as lateral guides if required. The end-projections $p$ $p$ may stand clear of the bushes $b$ $b$ as shown in Figs. 1, 3 and 5; or they may lie in contact with the bushes, as shown in Figs. 2 and 4, or they may be bent at their ends, as shown in Fig. 3ª, so that their edges $x$ are in contact with the bushes. The advantage of having the end-projections in contact with the bushes is that the stresses are then better distributed, and the chain is stiffer to resist lateral whipping.

In the modified construction of chain shown in Fig. 5, the end-projections of the links extend beyond the bushes so that when the elements are spaced apart on the studs by the bushes, the end-projections overlap in pairs, one on each side of the row of bushes.

Having thus described my invention, what I claim as new and desire to secure by Letters Patent is:—

1. In a multiple strand driving chain, the combination of a plurality of studs, and a plurality of link elements threaded thereon, each of said elements comprising a pair of links with the ends thereof turned laterally of the webs to form gearing faces, and with apertures therein near to the ends, and two cylindrical bushes thrust respectively through the corresponding pairs of apertures in the links and serving to connect together said links.

2. In a multiple strand driving chain, the combination of a plurality of studs, and a plurality of link elements threaded thereon, each of said elements comprising a pair of links with the ends thereof turned laterally of the webs to form gearing faces, and with apertures therein near to the ends, and two cylindrical bushes thrust respectively through the corresponding pairs of apertures in the links and serving to connect together said links in a position such that the laterally extended gearing faces of one link are directed toward those of the adjacent link and are in contact at their ends therewith.

3. In a multiple strand driving chain, the combination of a plurality of studs, and a plurality of link elements threaded thereon, each of said elements comprising a pair of links with the ends thereof turned laterally of the webs to form gearing faces, and with apertures therein near to the ends, and two cylindrical bushes thrust respectively through the corresponding pairs of apertures in the links and serving to connect together said links, the laterally extended ends of said links being of such a form that their outer ends bear against the bushes.

4. In a multiple strand driving chain, the combination of a plurality of studs, and a plurality of link elements threaded thereon, each of said elements comprising a pair of links with the ends thereof turned laterally of the webs to form gearing faces, and with apertures therein near to the ends, and two cylindrical bushes thrust respectively through the corresponding pairs of apertures in the links and serving to connect together said links, the laterally extended ends of said links being of such a form as to stand clear of the bushes at the part adjacent to the link webs, and having their outer ends bent back so as to bear against said bushes.

5. In a multiple strand driving chain, the combination of a plurality of studs, and a plurality of link elements threaded thereon, each of said elements comprising a pair of links with the ends thereof turned laterally of the webs to form gearing faces, and with apertures therein near to the ends, and two cylindrical bushes thrust respectively through the corresponding pairs of apertures in the links and serving to connect together said links in a position such that their laterally extended ends are directed inwardly toward one another, said laterally extended ends being also bent back at their outer edges and formed to bear against the bushes.

In witness whereof, I have hereunto signed my name this 2nd day of April 1914 in the presence of two subscribing witnesses.

CHRISTOPHER GABRIEL EDEN.

Witnesses:
ARTHUR ASHCROFT,
CHARLES ERNEST MAYCOCK.